United States Patent
Sato et al.

[11] Patent Number: 6,157,339
[45] Date of Patent: Dec. 5, 2000

[54] RADAR FOR ENABLING ACCURATE DETERMINATION OF FALSE IMAGE OF TARGET

[75] Inventors: Takashi Sato; Manabu Hirao, both of Tokyo, Japan

[73] Assignee: NEC Corporation, Tokyo, Japan

[21] Appl. No.: 09/348,453

[22] Filed: Jul. 7, 1999

[30] Foreign Application Priority Data

Jul. 7, 1998 [JP] Japan .................................. 10-191260

[51] Int. Cl.[7] .................................................. G01S 13/93
[52] U.S. Cl. ......................... 342/70; 342/107; 342/113; 342/115; 342/127; 342/133; 342/139; 342/146
[58] Field of Search ................................ 342/70, 71, 72, 342/106, 107, 109, 113, 114, 115, 127, 133, 139, 146, 161, 162, 195

[56] References Cited

U.S. PATENT DOCUMENTS

| 3,778,827 | 12/1973 | Strenglein | 342/80 |
| 4,449,127 | 5/1984 | Sanchez | 342/80 |
| 4,656,480 | 4/1987 | Allezard et al. | 342/151 |

FOREIGN PATENT DOCUMENTS

| 5-240948 | 9/1993 | Japan . |
| 7-280918 | 10/1995 | Japan . |
| 7-294625 | 11/1995 | Japan . |
| 8-334557 | 12/1996 | Japan . |
| 9-68573 | 3/1997 | Japan . |
| 9-90031 | 4/1997 | Japan . |
| 9-222474 | 8/1997 | Japan . |
| 10-39009 | 2/1998 | Japan . |

*Primary Examiner*—John B. Sotomayor
*Attorney, Agent, or Firm*—Foley & Lardner

[57] ABSTRACT

A radar is provided, which enables determination of whether a detected target is a false image generated by a side lobe of the beam received by the antenna. In the radar, the first phase difference is obtained by actually calculating the target angle in the angle calculating section, and by supplying the calculated angle to a theoretical formula (with respect to the phase difference) in the first phase-difference calculating section. The second phase difference is directly calculated using actual received signals in the second phase-difference calculating section. These phase differences are compared with each other by the phase-difference calculating section, thereby determining whether the target exists at a side-lobe angle position of the beam received by the receiving antenna, based on a difference between two phase-difference characteristics. Accordingly, it is possible to accurately determine a false image of the target, generated by a side lobe of the beam received by the antenna, without reducing the side-lobe level of the antenna.

8 Claims, 10 Drawing Sheets

RADAR FOR ENABLING ACCURATE DETERMINATION OF FALSE IMAGE OF TARGET

BACKGROUND OF THE INVENTION

1. Field of the Invention

The present invention relates to a radar, in particular, an on-vehicle radar used for determining whether a detected target is a false image.

This application is based on Patent Application No. Hei 10-191260 filed in Japan, the contents of which are incorporated herein by reference.

2. Description of the Related Art

A conventional on-vehicle radar used for preventing collisions of vehicles or the like is known, which is excellent in determination or judgment of an obstacle existing in the horizontal direction. For example, a radar using the amplitude comparison monopulse method is known (refer to Japanese Unexamined Patent Application, First Publication, Nos. Hei 9-68573 and 8-334557, and the like). In the operation of such a radar using the amplitude comparison monopulse method, (i) a radio wave is radiated via a plurality of antenna elements which are arranged such that portions of radiating patterns thereof overlap with each other, (ii) a signal reflected by a target is received by a plurality of antenna elements, (iii) the frequency of each received signal is converted into an intermediate frequency, (iv) the frequency-converted signal is converted into a digital signal, and (v) the converted digital signal is supplied to a signal processor so as to detect a target based on a frequency-analysis method such as the FFT (fast Fourier transform).

In the conventional radar, a false image of the target, generated by a side lobe of the beam received by the antenna, is determined with reference to the difference between the received power at the angular position of the main lobe and the received power at the angular position of the side lobe.

Figure 8:
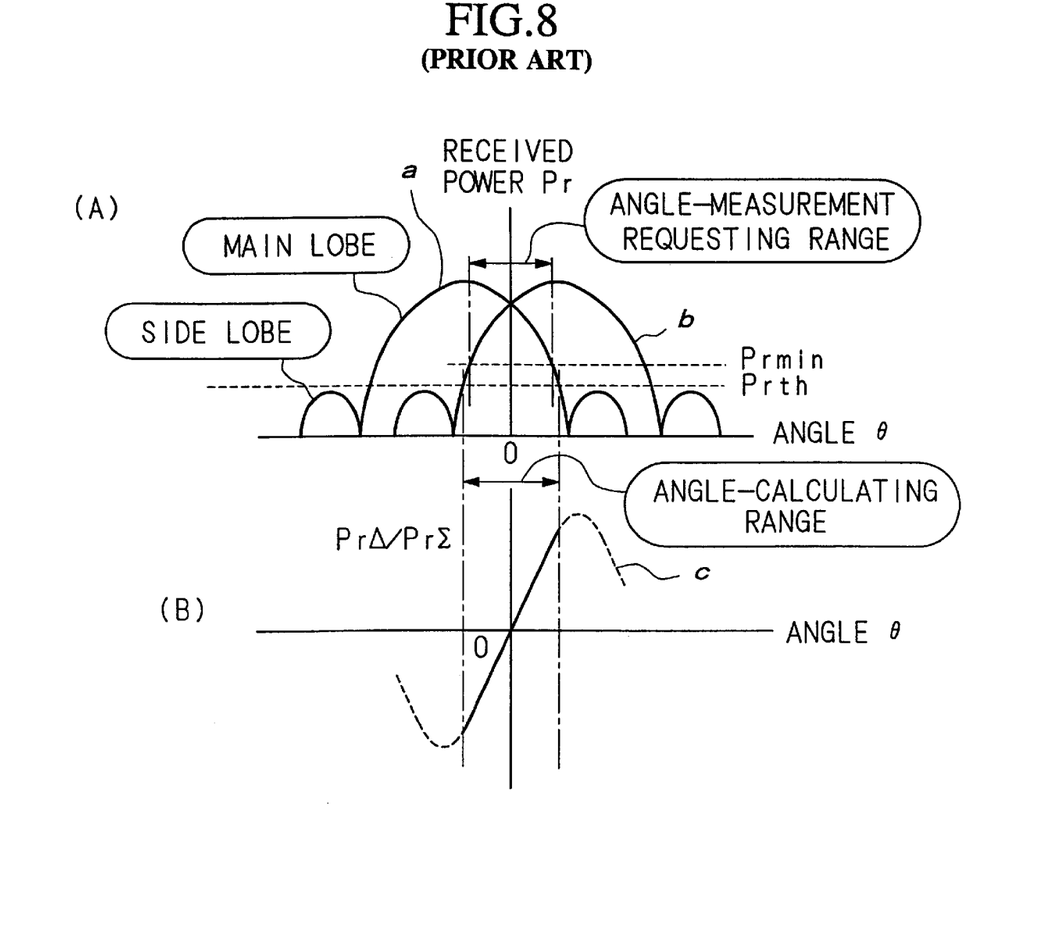
FIGS. 8A and 8B are diagrams explaining a conventional example.

FIG. 8 is a diagram explaining a method for determining a false image based on the difference of values or amounts of power, performed in the above-described conventional radar.

In part (A) of the figure, curves a and b respectively indicate received power Pra and received power Prb of the signal received by two receiving antennas. These power energies belong to the main lobes. In part (B) of FIG. 8, curve c indicates the ratio (Pr Δ/Pr Σ) of the sum to the difference of the received power values. In the signal processor, threshold Prth is defined as shown in part (A) of FIG. 8, so that the angle calculation for detecting the angle (of the target) is not performed for signals having a level below the threshold.

Therefore, the angle calculation is not performed for the dotted-lined parts of curve c, corresponding to side-lobe angle ranges, so that no false image of the target is generated in those ranges. Here, in order to enable the angle calculation within an angle-measurement requesting range, threshold Prth must be smaller than the minimum received power Prmin in an angle-calculating (or measuring) range.

However, the above conventional radar has the following problem. The received power Pr is represented by the following formula (using the radar equation):

$$Pr = \frac{Pt \cdot Gt \cdot Gr \cdot \lambda^2 \cdot \sigma}{(4\pi)^3 \cdot R^4} \quad (1)$$

where Pt denotes the transmitted power, λ denotes the wavelength of the transmitted signal, Gt denotes the transmitting gain, σ denotes the effective reflection area of the target, Gr denotes the receiving gain, and R denotes the distance to the target.

In the above formula, Pt, Gt, Gr, and λ have values peculiar to the radar. If a high-pass filter having a cut-off frequency of $f^4$ (f is the intermediate frequency) is used in the receiving circuit (so as to perform the attenuation correction using "R"), then the received power Pr depends on the effective reflection area σ of the target.

Figure 9:
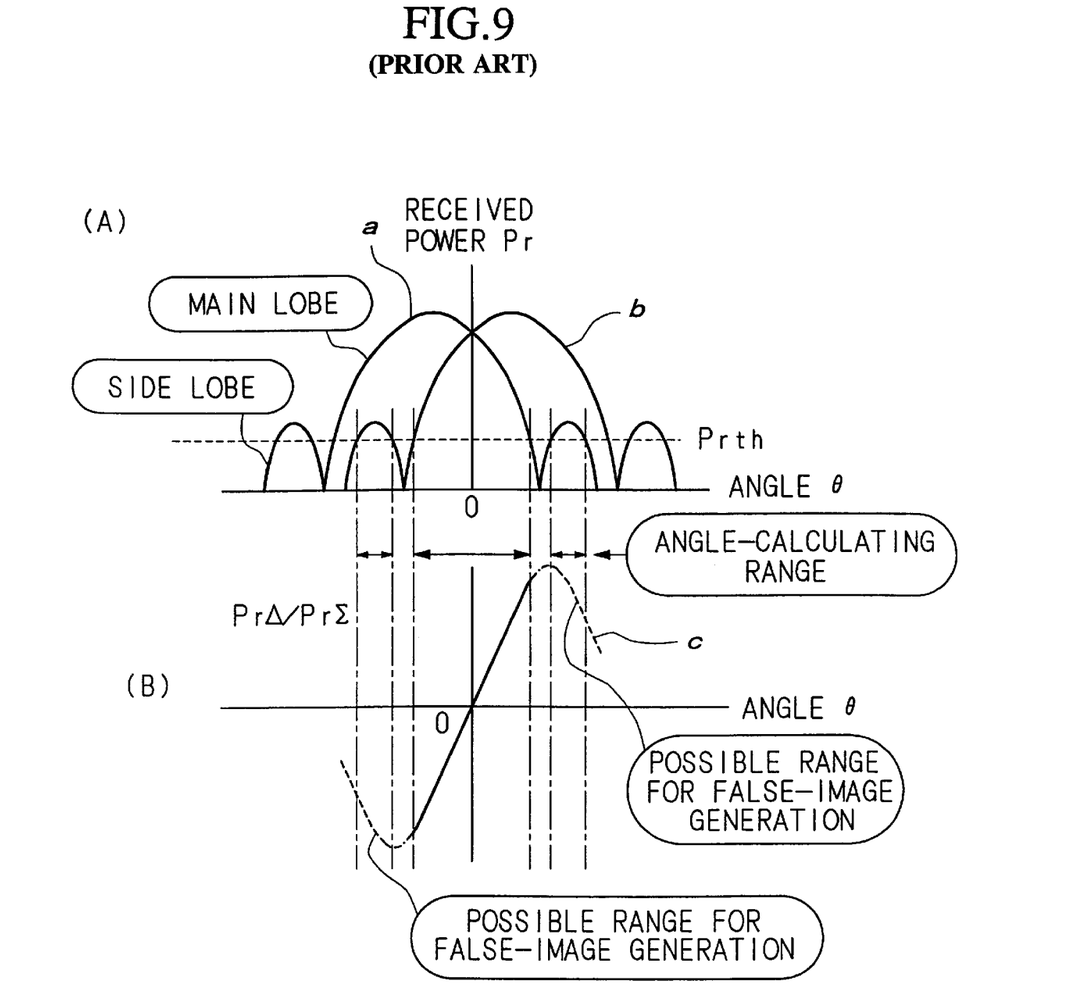
FIGS. 9A and 9B are diagrams explaining a conventional problem.

FIG. 9 is a diagram showing received power Pra and received power Prb, and the ratio Pr Δ/Pr Σ when the effective reflection area σ of the target is large. As shown in part (A) in FIG. 9, the received power at the angular position corresponding to each side lobe exceeds the threshold Prth, and false images are generated in the corresponding angular ranges.

Figure 10:
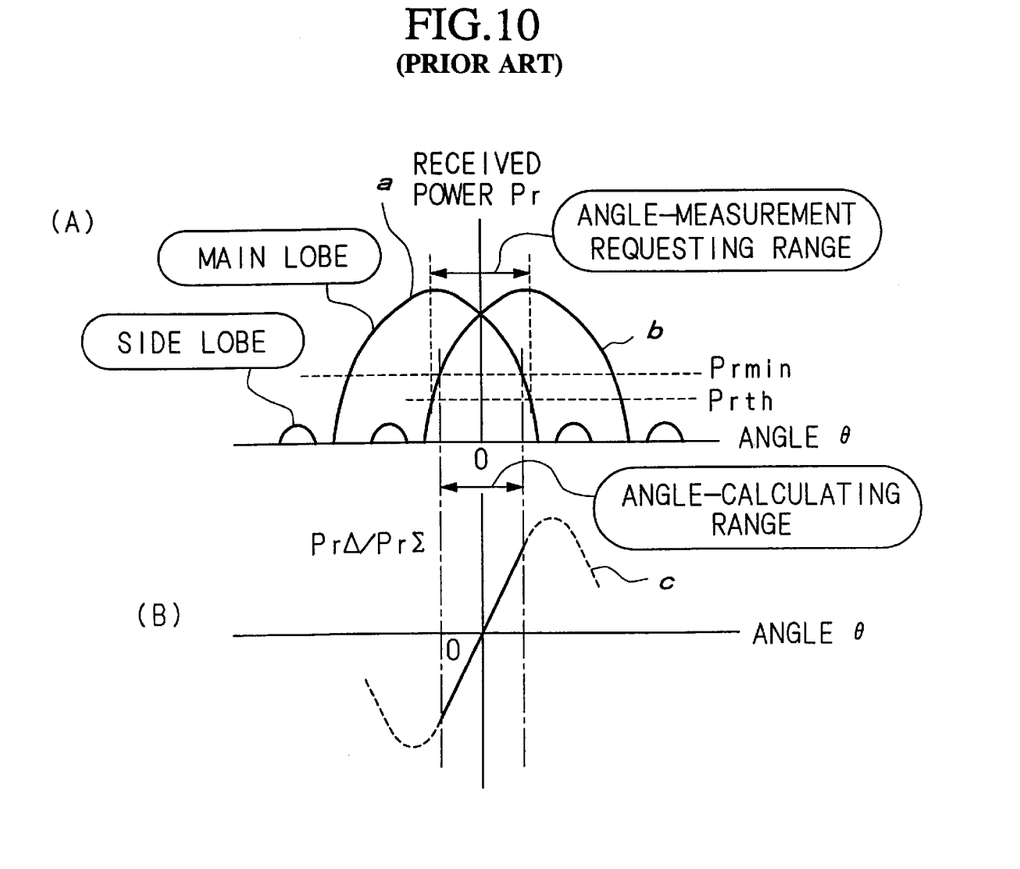
FIGS. 10A and 10B are diagrams explaining a conventional problem.

FIG. 10 is a diagram showing received power Pra and received power Prb, and the ratio Pr Δ/Pr Σ when the effective reflection area σ of the target is small. As shown in part (A) in FIG. 10, the minimum received power Prmin within the angle-measurement requesting range is smaller than the threshold Prth; thus, the angle cannot be calculated within the relevant range, and the angle calculation cannot be performed in the angle-measurement requesting range.

Therefore, in order that the received power at the angular range of each side lobe is equal to or smaller than the threshold Prth with respect to the upper limit of the effective reflection area σ of the target, and that the minimum received power Prmin within the angle-calculating range is equal to or larger than the threshold Prth with respect to the lower limit of the effective reflection area σ of the target, an antenna having low-level side lobes is necessary. However, there is a limit to reduce the level of the side lobe, and an antenna having reduced-level side lobes is expensive.

SUMMARY OF THE INVENTION

In consideration of the above circumstances, an objective of the present invention is to provide a radar for enabling determination of whether a detected target is a false image generated by a side lobe of the beam received by the antenna.

Therefore, the present invention provides a radar comprising:

transmitted wave generating means for transmitting a transmitted wave to a target;

first and second receiving antennas, separated by a predetermined distance, for individually receiving a reflected wave obtained by reflecting the transmitted wave off the target;

angle calculating means for calculating an angle of the target based on values of power received by the first and second receiving antennas, by using the amplitude comparison monopulse method;

first phase-difference calculating means for calculating a phase difference between signals received by the first and second receiving antennas, based on the angle of the target calculated by the angle calculating means;

second phase-difference calculating means for directly calculating a phase difference between the signals received by the first and second receiving antennas;

phase-difference comparing means for comparing the phase differences calculated by the first and second phase-difference calculating means; and determination means for determining whether the target is a false image, wherein if the difference obtained by the phase-difference comparing means is less than a predetermined value, then the target is determined as a true image, while if the difference obtained by the phase-difference comparing means is equal to or larger than the predetermined value, then the target is determined as a false image.

According to the above structure, the first phase difference is obtained by actually calculating the target angle in the angle calculating means, and by supplying the calculated angle to a theoretical formula (with respect to the phase difference) in the first phase-difference calculating means. The second phase difference is directly calculated using actual received signals in the second phase-difference calculating means. These phase differences are compared with each other, thereby determining whether the target exists at a side-lobe angle position of the beam received by the receiving antenna, based on a difference between two phase-difference characteristics.

Typically, the angle calculating means calculates the sum Pr Σ and the difference Pr Δ of the values of power received by the first and second receiving antennas, and then calculates the ratio Pr Δ/Pr Σ of the difference to the sum, and calculates the angle of the target based on the ratio.

Also typically, the first phase-difference calculating means calculates the phase difference using a formula "360d·sin θ/λ" where d denotes the distance between the first and second receiving antennas, θ denotes the angle of the target calculated by the angle calculating means, and λ denotes the wavelength of the transmitted wave.

The present invention also provides a radar comprising:

transmitted wave generating means for transmitting a transmitted wave to a target;

first and second receiving antennas, separated by a predetermined distance, for individually receiving a reflected wave obtained by reflecting the transmitted wave off the target;

first angle calculating means for calculating an angle of the target based on values of power received by the first and second receiving antennas, by using the amplitude comparison monopulse method;

phase-difference calculating means for directly calculating a phase difference between signals received by the first and second receiving antennas;

second angle calculating means for calculating an angle of the target based on the phase difference calculated by the phase-difference calculating means;

angle comparing means for comparing the angles calculated by the first and second angle calculating means; and determination means for determining whether the target is a false image, wherein if the difference obtained by the angle comparing means is less than a predetermined value, then the target is determined as a true image, while if the difference obtained by the angle comparing means is equal to or larger than the predetermined value, then the target is determined as a false image.

In this structure, the target angle is directly calculated using the actual received signals in the first angle calculating means. In parallel to this operation, the phase difference is directly calculated using the actual received signals in the phase-difference calculating means, and this phase difference is supplied to a theoretical formula (with respect to the angle) in the second angle calculating means. The directly-calculated target angle and the angle calculated using the theoretical formula are compared, thereby determining whether the target exists at a side-lobe angle position of the beam received by the receiving antenna, based on a difference between two angle characteristics.

Typically, the first angle calculating means calculates the sum Pr Σ and the difference Pr Δ of the values of power received by the first and second receiving antennas, and then calculates the ratio Pr Δ/Pr Σ of the difference to the sum, and calculates the angle of the target based on the ratio.

Also typically, the second angle calculating means calculates the angle of the target using a formula "$\sin^{-1}(\phi \lambda / (360d))$" where d denotes the distance between the first and second receiving antennas, φ denotes the phase difference calculated by the phase-difference calculating means, and λ denotes the wavelength of the transmitted wave.

According to the present invention, it is possible to accurately determine a false image of the target, generated by a side lobe of the beam received by the antenna.

DESCRIPTION OF THE PREFERRED EMBODIMENTS

Hereinafter, embodiments of the present invention will be explained with reference to the drawings.

Figure 1:
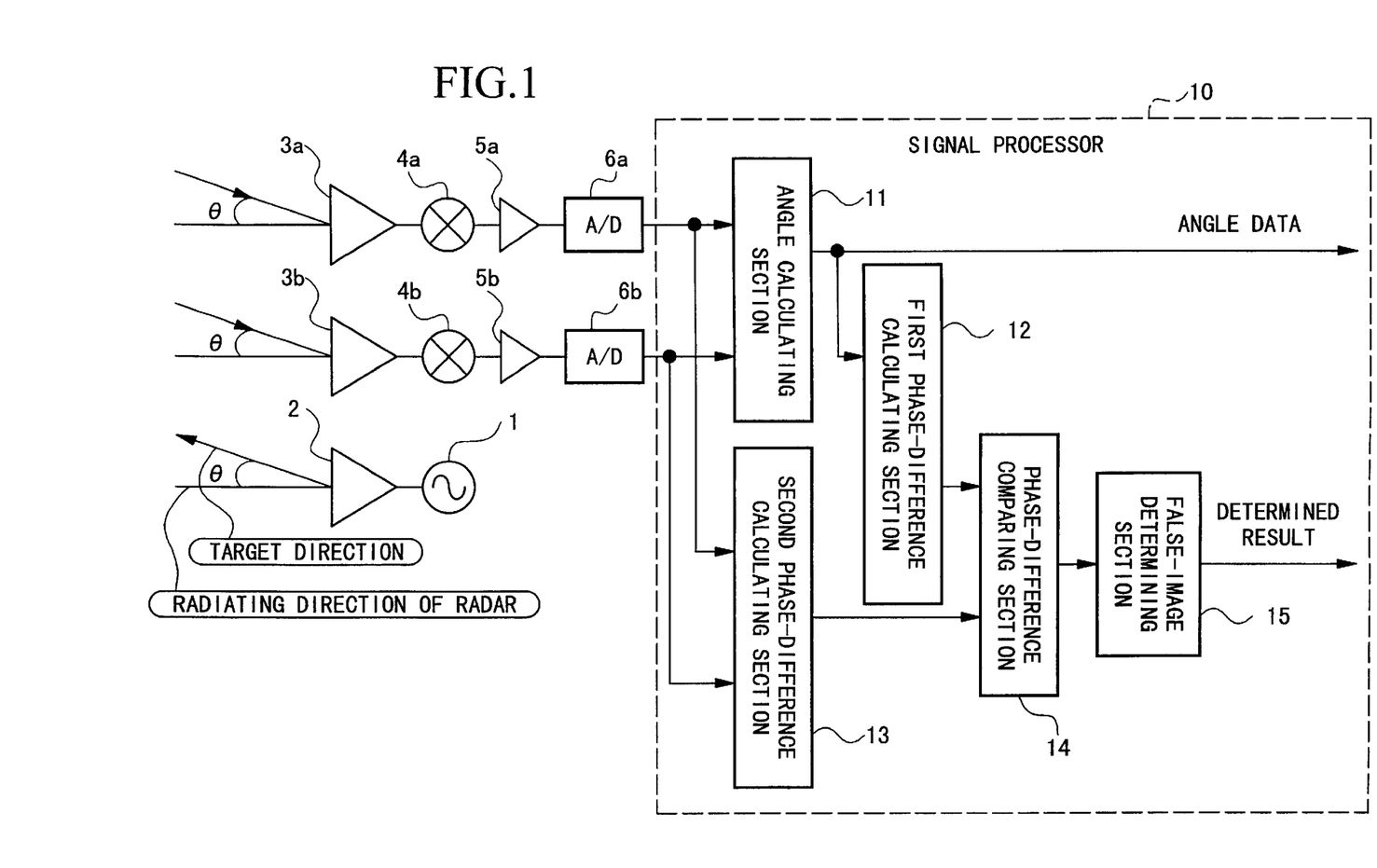
FIG. 1 is a diagram explaining the structure of the radar as the first embodiment according to the present invention.

FIG. 1 is a diagram explaining the structure of the radar as the first embodiment according to the present invention. As shown in the figure, the radar of this embodiment comprises oscillator 1, transmitting antenna 2, two receiving antennas 3a and 3b, mixers 4a and 4b into which the received signals are input, and amplifiers 5a and 5b for respectively amplifying the signals output from the mixers 4a and 4b, and A/D converters 6a and 6b for respectively converting the amplified signals into digitized signals, and signal processor 10.

The signal processor 10 comprises angle calculating section 11, first phase-difference calculating section 12, second phase-difference calculating section 13, phase-difference comparing section 14, and false-image determining section 15. The angle calculating section 11 calculates the angle of a target using the amplitude comparison monopulse method. The first phase-difference calculating section 12 calculates the phase difference, that is, the difference between the phases of the received signals, based on angle data calculated by the angle calculating section 11. The second phase-difference calculating section 13 directly calculates the phase difference between the received signals.

The general operations performed by the radar of FIG. 1 are as follows: The signal generated by the oscillator 1 is transmitted to a target via the transmitting antenna 2, and the signal is reflected by the target. The reflected wave is then received by the receiving antennas 3a and 3b. The frequencies of the received signals from the antennas 3a and 3b are respectively converted into intermediate frequencies, and the signals are then amplified by the amplifiers 5a and 5b. The amplified signals are further converted into digital signals by the A/D converters 6a and 6b, and then input into the signal processor 10.

In the signal processor 10, values of power of the received signals (having the intermediate frequencies), which were digitized by the A/D converters 6a and 6b, are calculated and the angle of the target (i.e., target angle) is calculated using the amplitude comparison monopulse method, by the angle calculating section 11. The first phase-difference calculating section 12 calculates the phase difference between the two received signals based on the calculated angle data. The phase difference can be represented using a function with respect to the target angle, and the phase difference can be calculated by supplying the calculated angle data to this function and calculating the function.

Simultaneously, in the second phase-difference calculating section 13 of the signal processor 10, the phase difference between the received signals is directly calculated. The phase-difference comparing section 14 compares two phase differences obtained by the phase-difference calculating sections 12 and 13, and calculates the difference between them. Next, the false-image determining section 15 determines whether the detected target is a false image based on the difference obtained by the phase-difference comparing section 14. If the angle of the target corresponds to a side lobe angle of the received beam, an accurate target angle cannot be calculated using the amplitude comparison monopulse method. In this case, the detected target is a false image.

At that position (where a false image is generated), the phase difference calculated by the first phase-difference calculating section 12 is also not correct, and this incorrect value does not agree with (the value of) the phase difference which was directly calculated by the second phase-difference calculating section 13. Therefore, it can be determined whether the angle data of the detected target is correct, that is, whether the target is a false image, by comparing the above phase differences.

Hereinafter, the operations of the radar of the present embodiment will be explained with reference to the flow-chart of FIG. 2 and the diagrams of FIGS. 3 to 6. In the signal processor 10 in FIG. 1, the angle calculating section 11 calculates power values of the intermediate-frequency signals (of the received signals), digitized by the A/D converters 6a and 6b, and calculates the angle of the target by using the amplitude comparison monopulse method (see step A1).

Figure 3A:
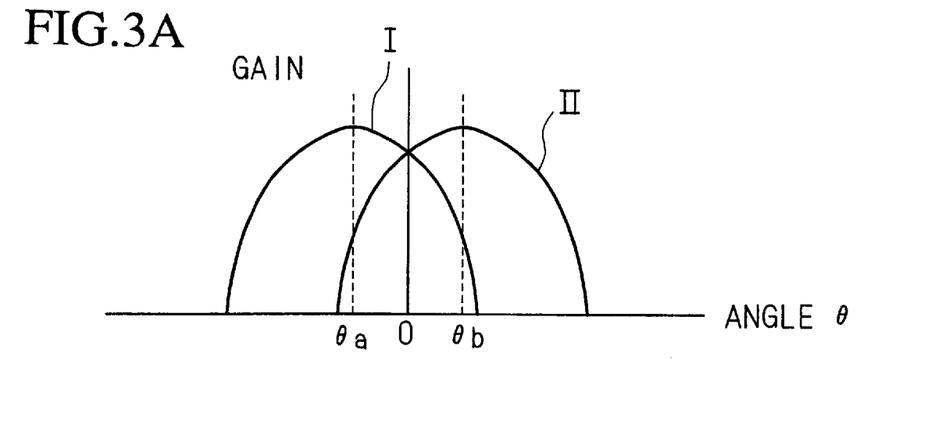
FIGS. 3A–3C are diagrams explaining the principle for calculating the angle by using the amplitude comparison monopulse method.
Figure 3B:
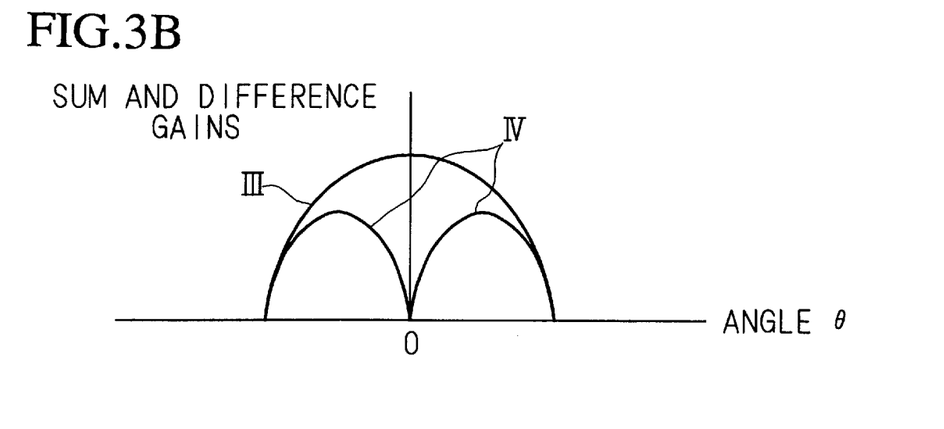
Figure 3C:
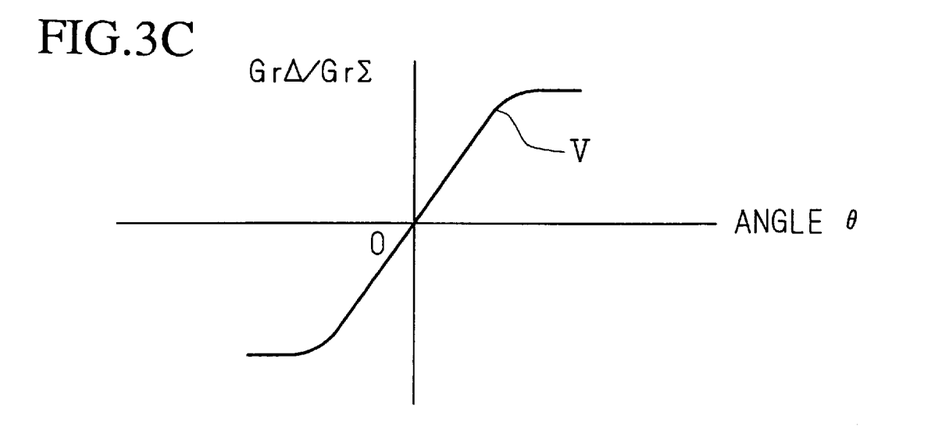

Below, the principle of the angle calculation using the amplitude comparison monopulse method will be explained with reference to FIGS. 3A to 3C. As shown in FIG. 3A, the direction indicated by curve I of gain Gra of the receiving antenna 3a differs from the direction indicated by curve II of gain Grb of the receiving antenna 3b. Specifically, these directions respectively differ from the radiating direction of the radar (angle θ=0°) by specific angles θ a and θ b.

In the amplitude comparison monopulse method, the sum gain Gr Σ and the difference gain Gr Δ of the above gains are calculated. Here, the sum gain Gr Σ of the two gains is shown by curve III in FIG. 3B, while the difference gain Gr Δ between the two gains is shown by curve IV in FIG. 3B. Subsequently, the ratio of the difference frequency Gr Δ to the sum frequency Gr Σ is calculated. FIG. 3C shows the calculated ratio Gr Δ/Gr Σ. As shown in curve V, the ratio corresponds to the target angle θ.

The above ratio Gr Δ/Gr Σ agrees with the ratio (Pr Δ/Pr Σ) of the difference to the sum of the power values of the signals received by the receiving antennas 3a and 3b. Therefore, the angle calculating section 11 acquires the value of the power of the intermediate-frequency signal of each received signal, this value being equivalent to the received power of each received signal, and calculates the ratio Pr Δ/Pr Σ, thereby obtaining the power ratio corresponding to the target angle. Accordingly, the target angle can be calculated using the power ratio.

Figure 4A:
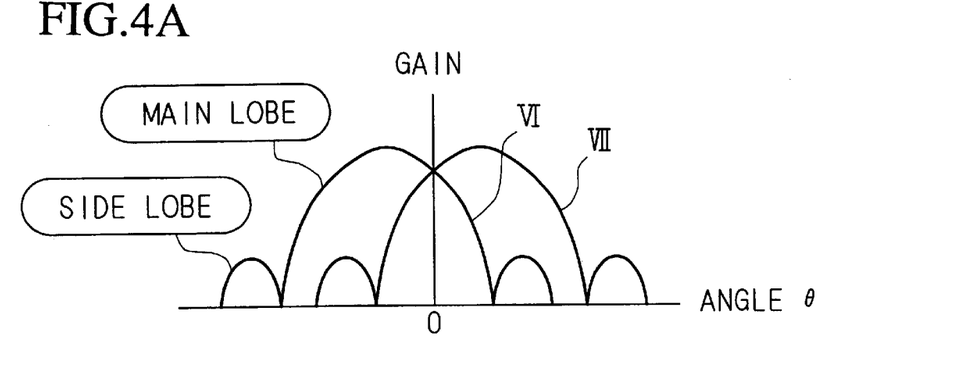
FIGS. 4A–4C are diagrams showing the effects on the target angle calculation, caused by side lobes of the beam received by the antenna.
Figure 4B:
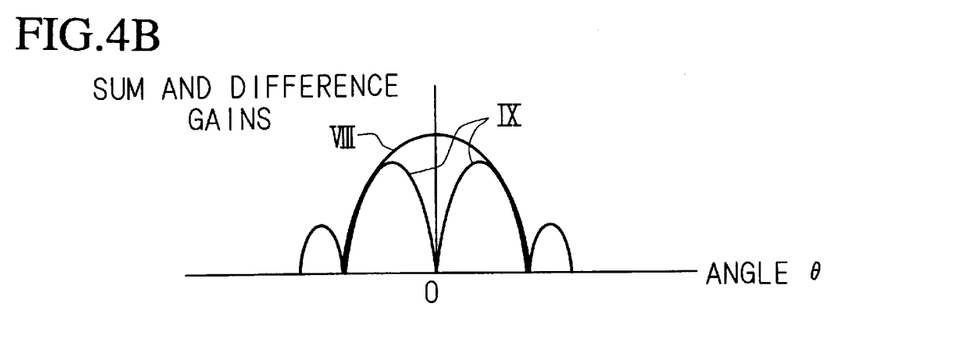
Figure 4C:
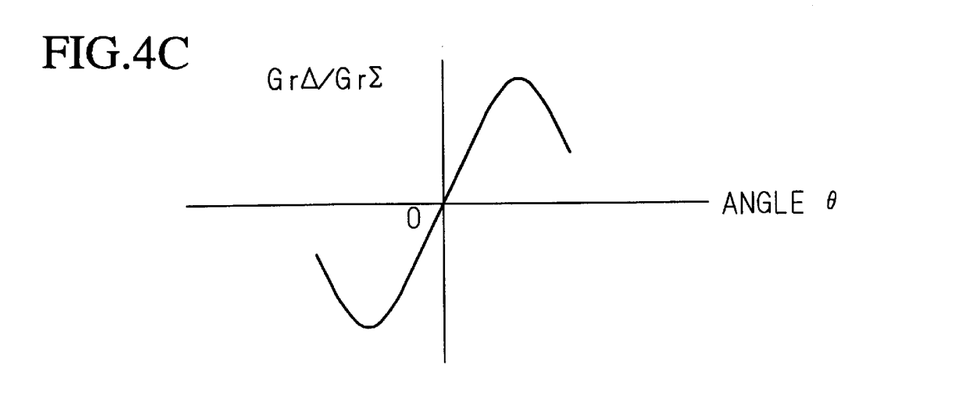

FIGS. 4A to 4C are diagrams showing the effects on the target angle calculation caused by side lobes of the beam received by the antenna. FIG. 4A shows beams received by the antennas when side lobes are observed. In this figure, curve VI indicates a main lobe of the gain of the receiving antenna 3a, while curve VII indicates a main lobe of the gain of the receiving antenna 3b. FIG. 4B shows the sum gain Gr Σ (see curve VIII) of the two gains of the receiving antennas and the difference gain Gr Δ (see curve IX) between the two gains of the receiving antennas. FIG. 4C shows the ratio of the difference gain Gr Δ to the sum gain Gr Σ.

As shown in FIG. 4C, in the angle range where side lobes are observed, the value | Gr Σ/ Gr Δ | is smaller due to the side lobe. Therefore, an angle position in the side-lobe angle range is regarded as an angle position having the same value | Gr Σ/ Gr Δ | in the main-lobe angle range; thus, the target is a false image in this case.

Figure 2:
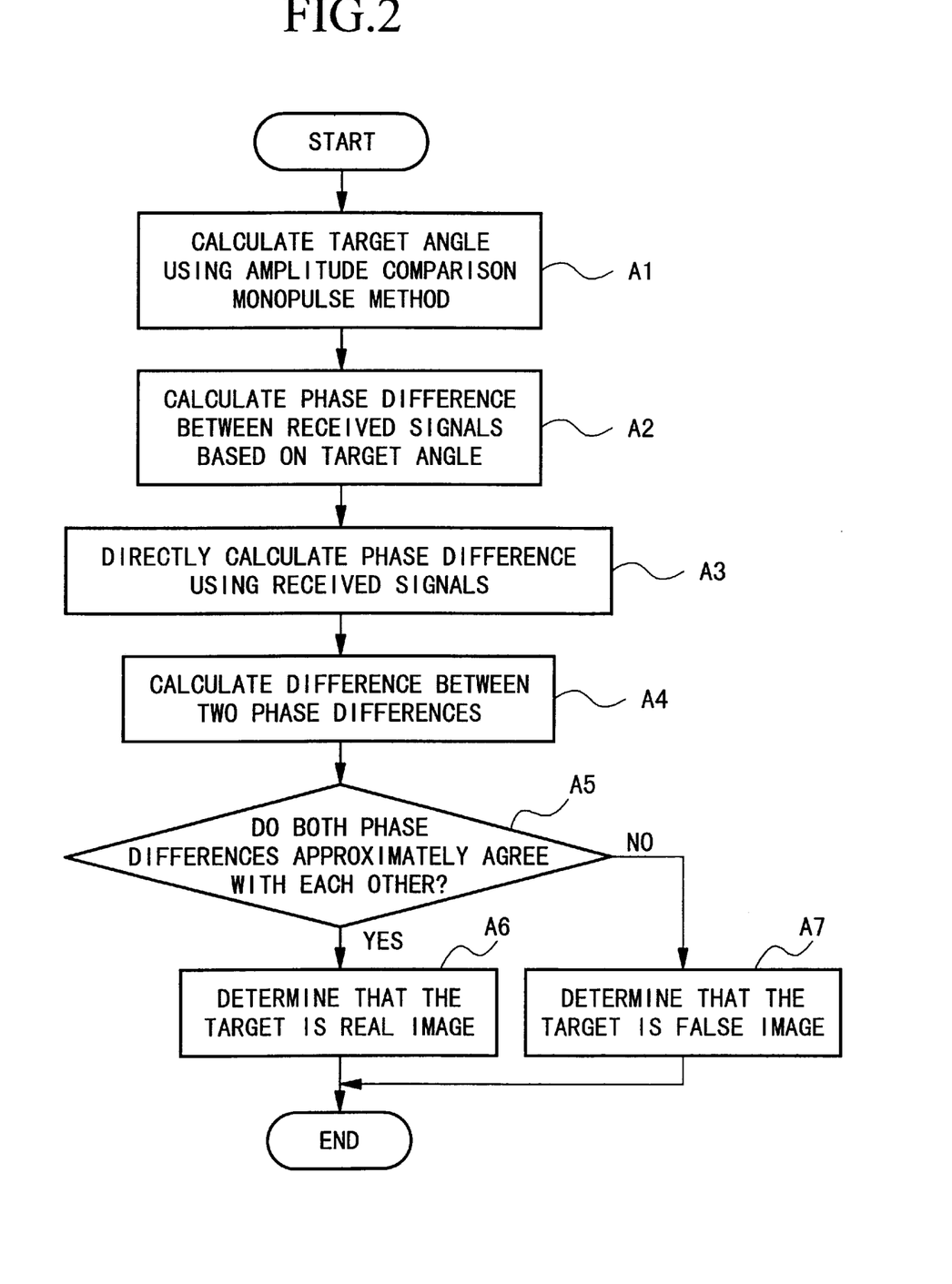
FIG. 2 is a flowchart showing the operations performed by the radar of FIG. 1.
Figure 5:
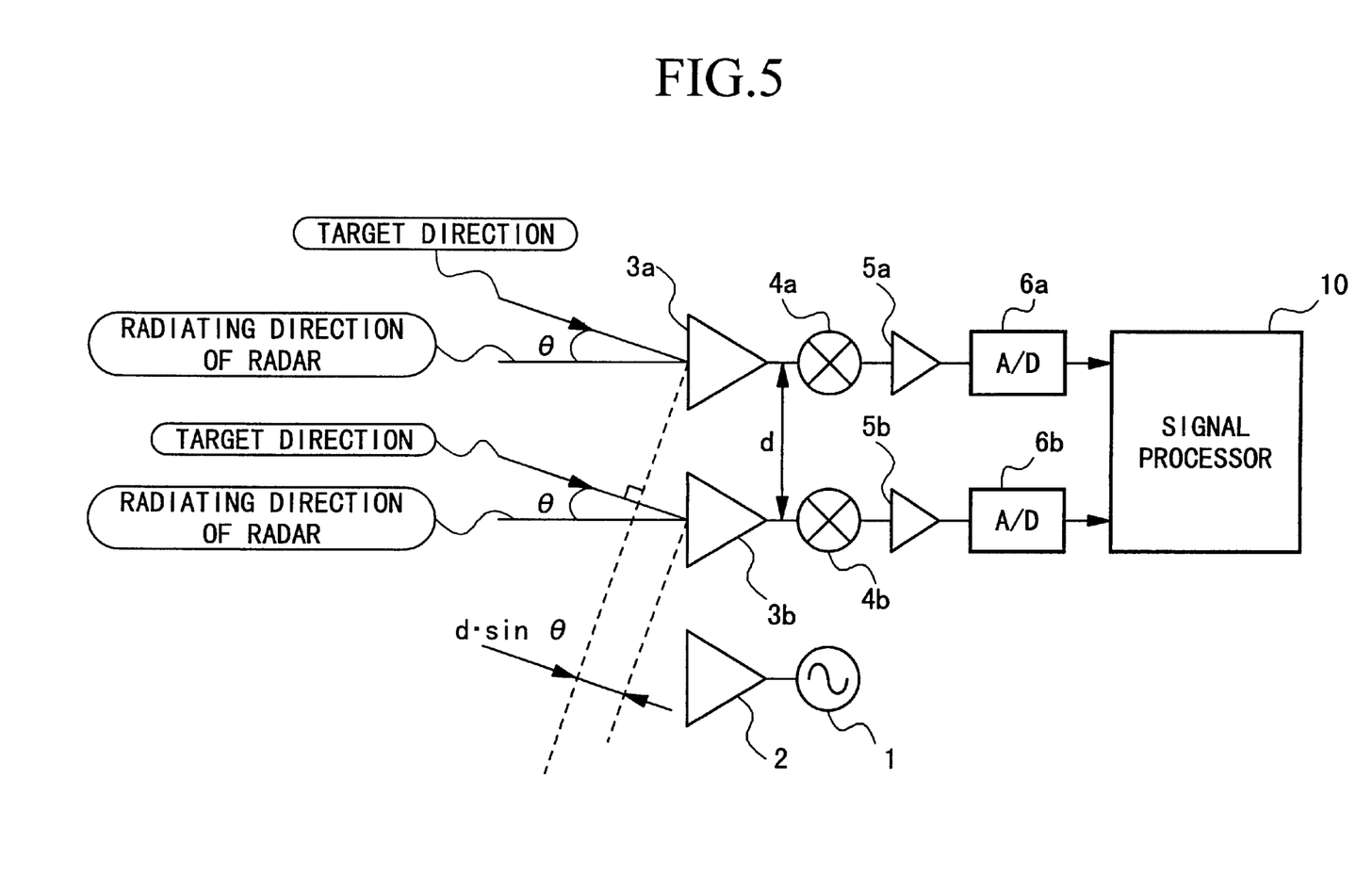
FIG. 5 is a diagram explaining the phase difference between the received signals.

The first phase-difference calculating section 12 calculates the phase difference between the received signals based on the angle data calculated by the angle calculating section 11 (see step A2 in FIG. 2). The phase difference between the received signals can be represented using a function with respect to the target angle. As shown in FIG. 5, there is a difference "d·sin θ" between the distance from the target to the receiving antenna 3a and the difference from the target to the receiving antenna 3b. Here, "d" denotes the distance between the receiving antennas, and θ denotes the angle of the target from the radar radiating direction. This difference between the distances causes the phase difference between the received signals, and this phase difference φ can be represented as the following function of angle θ:

$$\phi(\theta) = 360 \cdot d \cdot \sin \theta / \lambda (°) \quad (2)$$

where λ denotes the wavelength of the transmitted signal.

In the above formula, the distance d between the receiving antennas and the wavelength λ of the transmitted signal are known, and the angle θ obtained by the angle calculating section 11 is input into formula (2), thereby calculating the phase difference φ (θ) between the received signals.

In parallel to the calculating operation performed by the angle calculating section 11, the second phase-difference calculating section 13 directly calculates the phase difference between the received signals (see step A3 in FIG. 2). In the calculating operation of section 13, the phases of the two digitized intermediate-frequency signals are acquired using a frequency analyzing method such as FFT, and the difference between the phases is calculated.

Figure 6:
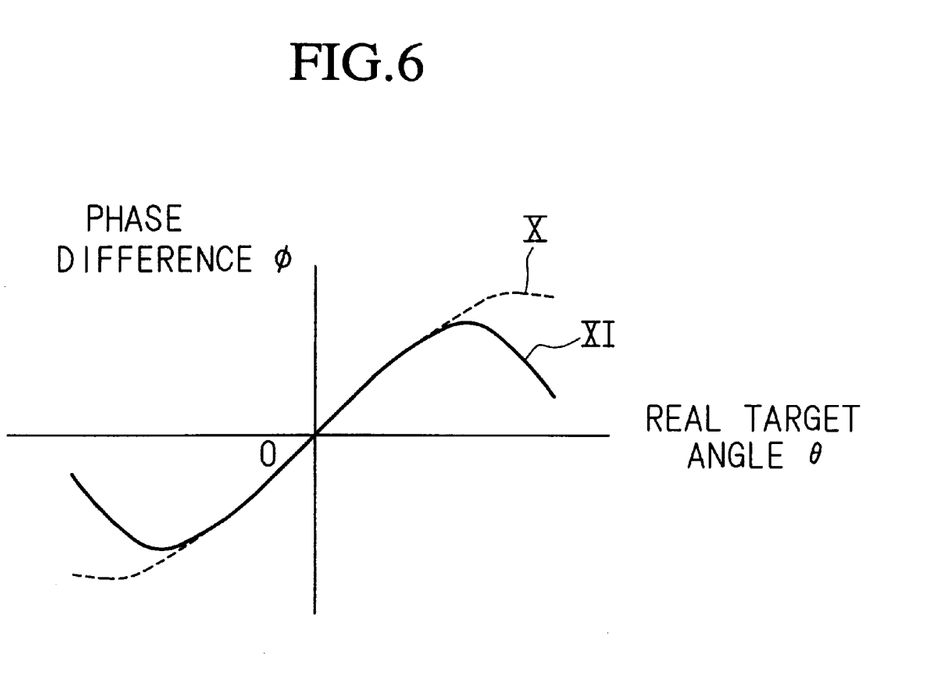
FIG. 6 is a diagram explaining the difference between the phase differences in side-lobe angle ranges.

FIG. 6 shows phase-difference curve X (indicated by a dotted curve) obtained by formula (2), and phase-difference curve XI (indicated by a solid curve) obtained by supplying angle data, calculated using Gr $\Sigma$/ Gr $\Delta$ shown in FIG. 4C, to formula (2). That is, in the figure, curve X is the phase-difference curve showing a relationship between the phase difference calculated by the second phase-difference calculating section 13 and the angle, while curve XI is the phase-difference curve showing a relationship between the phase difference calculated by the first phase-difference calculating section 12 and the angle. As shown in FIG. 6, both curves X and XI are different in side-lobe angle ranges because accurate angle data cannot be calculated in these ranges.

Next, the phase-difference comparing section 14 compares the phase differences which were respectively calculated by the first and second phase-difference calculating sections 12 and 13 so as to calculate the difference therebetween (see step A4 in FIG. 2). If the difference calculated by the phase-difference comparing section 14 is smaller than a predetermined value, the false-image determining section 15 determines that the compared phase differences agree with each other, and that the target is a true image (see steps S5 and A6 in FIG. 2). In contrast, if the calculated difference is equal to or larger than the predetermined value, the false-image determining section 15 determines that the compared phase differences do not agree with each other, that is, the target exists at a side-lobe angle position, and that the target is a false image (see steps S5 and A7 in FIG. 2).

Figure 7:
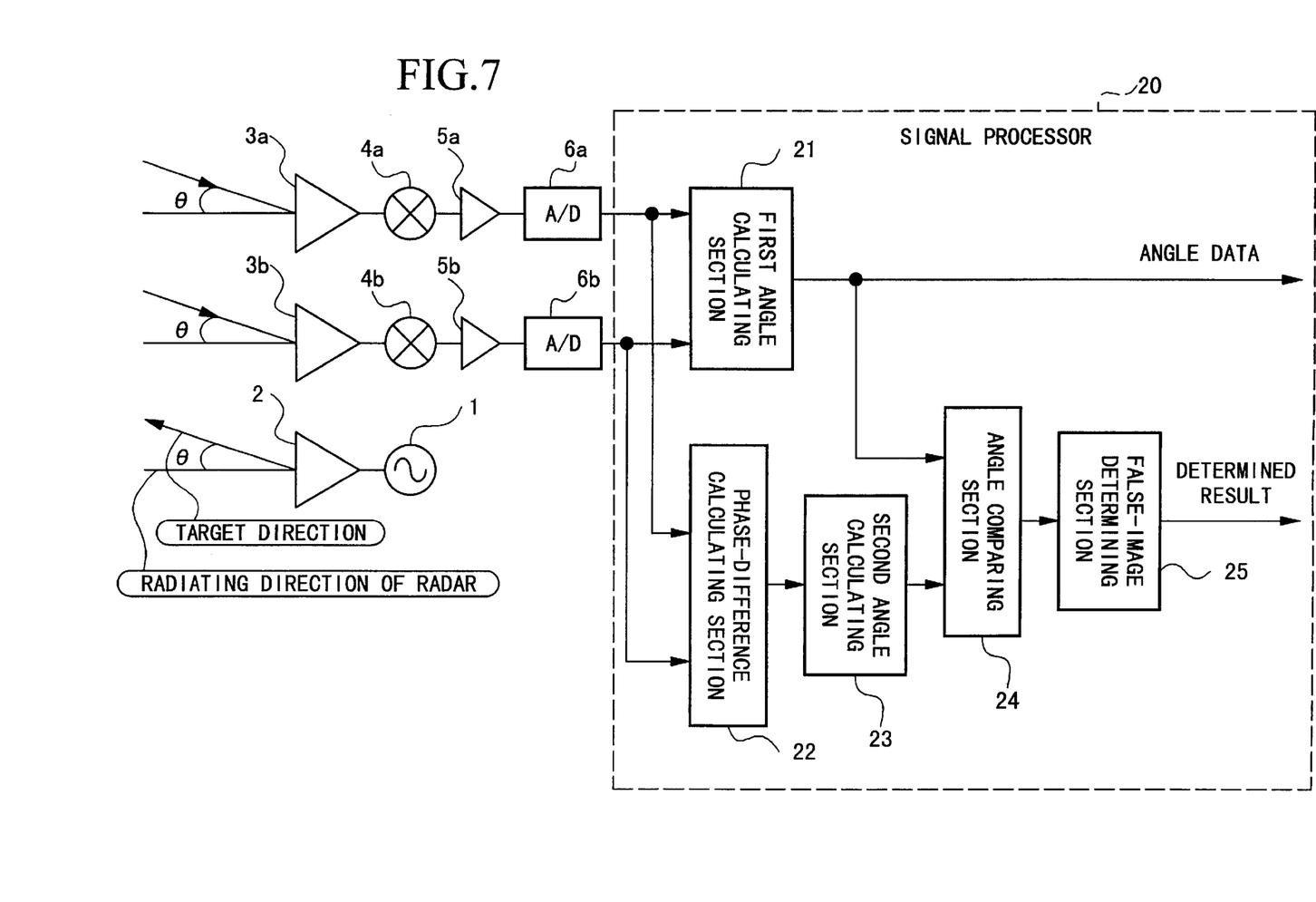
FIG. 7 is a diagram explaining the structure of the radar as the second embodiment according to the present invention.

Hereinafter, the second embodiment according to the present invention will be explained. FIG. 7 is a diagram explaining the structure of the radar of the second embodiment. In FIG. 7, parts identical to those in FIG. 1 are given identical reference numerals, and explanations thereof are omitted here.

In FIG. 7, signal processor 20 comprises first angle calculating section 21, phase-difference calculating section 22, second angle calculating section 23, angle comparing section 24, and false-image determining section 25.

The first angle calculating section 21 calculates the received power values of the digitized intermediate-frequency signals, and calculates the target angle using the amplitude comparison monopulse method. In parallel to this operation, the phase-difference calculating section 22 directly calculates the phase difference between the received signals based on the digitized intermediate-frequency signals. The second angle calculating section 23 calculates the target angle θ based on the phase difference between the received signals calculated by the section 22, by using the following formula:

$$\theta = \sin^{-1}(\phi \cdot \lambda/(360d)) \quad (3)$$

As shown by the above formula, the target angle θ can be represented as a function of the phase difference φ between the received signals.

The angle comparing section 24 compares the angles which were respectively calculated by the first and second angle calculating sections 21 and 23 so as to calculate the difference therebetween. If the difference calculated by the angle comparing section 24 is smaller than a predetermined value, the false-image determining section 25 determines that the compared angles agree with each other, and that the target is a true image. In contrast, if the calculated difference is equal to or larger than the predetermined value, the false-image determining section 25 determines that the compared angles do not agree with each other, that is, the target exists at a side-lobe angle position, and that the target is a false image.

As explained above, in the present embodiment, the target angles calculated by two angle calculating sections 21 and 23 are compared so as to determine whether the detected target is a false image. Also in this case, a false image of the target, generated due to a side lobe of the beam received by the antenna, can be detected, as in the first embodiment.

The present invention is not limited to the above embodiments. For example, three or more receiving antennas may be provided, wherein two of them are selectively used.

What is claimed is:

1. A radar comprising:

transmitted wave generating means for transmitting a transmitted wave to a target;

first and second receiving antennas, separated by a predetermined distance, for individually receiving a reflected wave obtained by reflecting the transmitted wave off the target;

angle calculating means for calculating an angle of the target based on values of power received by the first and second receiving antennas, by using the amplitude comparison monopulse method;

first phase-difference calculating means for calculating a phase difference between signals received by the first and second receiving antennas, based on the angle of the target calculated by the angle calculating means;

second phase-difference calculating means for directly calculating a phase difference between the signals received by the first and second receiving antennas;

phase-difference comparing means for comparing the phase differences calculated by the first and second phase-difference calculating means; and determination means for determining whether the target is a false image, wherein if the difference obtained by the phase-difference comparing means is less than a predetermined value, then the target is determined as a true image, while if the difference obtained by the phase-difference comparing means is equal to or larger than the predetermined value, then the target is determined as a false image.

2. A radar as claimed in claim 1, wherein the angle calculating means calculates the sum Pr $\Sigma$ and the difference Pr $\Delta$ of the values of power received by the first and second receiving antennas, and then calculates the ratio Pr $\Delta$/Pr $\Sigma$ of the difference to the sum, and calculates the angle of the target based on the ratio.

3. A radar as claimed in claim 1, wherein the first phase-difference calculating means calculates the phase difference using a formula "360d·sin θ/λ" where d denotes the distance between the first and second receiving antennas, θ denotes the angle of the target calculated by the angle calculating means, and λ denotes the wavelength of the transmitted wave.

4. A radar as claimed in claim 2, wherein the first phase-difference calculating means calculates the phase difference using a formula "360d·sin θ/λ" where d denotes the distance between the first and second receiving antennas, θ denotes the angle of the target calculated by the angle calculating means, and λ denotes the wavelength of the transmitted wave.

5. A radar comprising:

transmitted wave generating means for transmitting a transmitted wave to a target;

first and second receiving antennas, separated by a predetermined distance, for individually receiving a reflected wave obtained by reflecting the transmitted wave off the target;

first angle calculating means for calculating an angle of the target based on values of power received by the first and second receiving antennas, by using the amplitude comparison monopulse method;

phase-difference calculating means for directly calculating a phase difference between signals received by the first and second receiving antennas;

second angle calculating means for calculating an angle of the target based on the phase difference calculated by the phase-difference calculating means;

angle comparing means for comparing the angles calculated by the first and second angle calculating means; and determination means for determining whether the target is a false image, wherein if the difference obtained by the angle comparing means is less than a predetermined value, then the target is determined as a true image, while if the difference obtained by the angle comparing means is equal to or larger than the predetermined value, then the target is determined as a false image.

6. A radar as claimed in claim 5, wherein the first angle calculating means calculates the sum $Pr\,\Sigma$ and the difference $Pr\,\Delta$ of the values of power received by the first and second receiving antennas, and then calculates the ratio $Pr\,\Delta/Pr\,\Sigma$ of the difference to the sum, and calculates the angle of the target based on the ratio.

7. A radar as claimed in claim 5, wherein the second angle calculating means calculates the angle of the target using a formula "$\sin^{-1}(\phi\,\lambda\,(360d))$" where d denotes the distance between the first and second receiving antennas, $\phi$ denotes the phase difference calculated by the phase-difference calculating means, and $\lambda$ denotes the wavelength of the transmitted wave.

8. A radar as claimed in claim 6, wherein the second angle calculating means calculates the angle of the target using a formula "$\sin^{-1}(\phi\,\lambda\,(360d))$" where d denotes the distance between the first and second receiving antennas, $\phi$ denotes the phase difference calculated by the phase-difference calculating means, and $\lambda$ denotes the wavelength of the transmitted wave.

* * * * *